US008959433B2

(12) United States Patent
Schubert (10) Patent No.: US 8,959,433 B2
(45) Date of Patent: Feb. 17, 2015

(54) DOCUMENT EDITING USING ANCHORS

(75) Inventor: Kjell Schubert, Pittsburgh, PA (US)

(73) Assignee: Multimodal Technologies, LLC, Pittsburgh, PA (US)

( * ) Notice: Subject to any disclaimer, the term of this patent is extended or adjusted under 35 U.S.C. 154(b) by 569 days.

(21) Appl. No.: 11/840,970

(22) Filed: Aug. 19, 2007

(65) Prior Publication Data

US 2009/0113293 A1   Apr. 30, 2009

(51) Int. Cl.
*G06F 17/24*   (2006.01)
*G06F 17/30*   (2006.01)

(52) U.S. Cl.
CPC .......... *G06F 17/24* (2013.01); *G06F 17/30905* (2013.01)
USPC ............ 715/256; 715/754; 715/764; 715/835

(58) Field of Classification Search
CPC ........................... G06F 17/30905; G06F 17/24
USPC .................. 715/256, 754, 764, 835
See application file for complete search history.

(56) References Cited

U.S. PATENT DOCUMENTS

| 5,062,074 | A | * | 10/1991 | Kleinberger | 1/1 |
| 5,469,355 | A | * | 11/1995 | Tsuzuki | 704/9 |
| 5,515,491 | A | | 5/1996 | Bates et al. | |
| 5,761,683 | A | * | 6/1998 | Logan et al. | 715/206 |
| 5,781,909 | A | * | 7/1998 | Logan et al. | 1/1 |
| 5,802,299 | A | * | 9/1998 | Logan et al. | 709/218 |
| 5,917,486 | A | | 6/1999 | Rylander | |
| 6,064,961 | A | | 5/2000 | Hanson | |
| 6,081,772 | A | | 6/2000 | Lewis | |
| 6,100,881 | A | * | 8/2000 | Gibbons et al. | 715/201 |
| 6,115,686 | A | * | 9/2000 | Chung et al. | 704/260 |
| 6,360,237 | B1 | * | 3/2002 | Schulz et al. | 715/255 |
| 6,618,722 | B1 | * | 9/2003 | Johnson et al. | 1/1 |
| 7,089,278 | B1 | | 8/2006 | Churchill et al. | |
| 7,113,178 | B1 | * | 9/2006 | Webb | 345/173 |
| 7,308,643 | B1 | * | 12/2007 | Zhu et al. | 715/206 |

(Continued)

FOREIGN PATENT DOCUMENTS

JP   2004530205 A   9/2004
WO   02080143 A1   10/2002

OTHER PUBLICATIONS

Heslop et al., "Word 2003 Bible,"Wiley Publishing, Inc., 2003, pp. 77-91.

(Continued)

*Primary Examiner* — Stephen Hong
*Assistant Examiner* — Marshon Robinson
(74) *Attorney, Agent, or Firm* — Robert Plotkin, P.C.

(57) ABSTRACT

A user edits text in a draft document by providing input including left and right "anchor" text and replacement text. In response, a document editing system identifies an instance of the left anchor text followed by the right anchor text in the draft document, and replaces text between these instances with the replacement text specified by the user. For example, the user may type a string containing the left anchor text followed by the replacement text followed by the right anchor text, in response to which the system may perform the replacement just described. As a result, the user may specify both the location of, and a correction for, text in the draft document without using cursor keys or other navigation commands to navigate to the location of the text to be corrected, thereby increasing correction efficiency by avoiding the delay associated with such manual navigation.

13 Claims, 6 Drawing Sheets

(56) References Cited

U.S. PATENT DOCUMENTS

| | | | |
|---|---|---|---|
| 7,499,940 B1* | 3/2009 | Gibbs | 1/1 |
| 7,814,103 B1* | 10/2010 | Gravano et al. | 707/736 |
| 2003/0074353 A1* | 4/2003 | Berkan et al. | 707/5 |
| 2003/0172048 A1* | 9/2003 | Kauffman | 707/1 |
| 2005/0060290 A1* | 3/2005 | Herscovici et al. | 707/3 |
| 2006/0085395 A1* | 4/2006 | Cradick et al. | 707/3 |
| 2006/0098899 A1* | 5/2006 | King et al. | 382/305 |
| 2006/0143254 A1 | 6/2006 | Chen | |
| 2007/0061704 A1 | 3/2007 | Simova | |
| 2007/0143282 A1 | 6/2007 | Betz | |
| 2007/0168465 A1* | 7/2007 | Toppenberg et al. | 709/218 |
| 2007/0198474 A1* | 8/2007 | Davidson et al. | 707/3 |
| 2007/0198503 A1* | 8/2007 | Hogue et al. | 707/5 |
| 2008/0270896 A1* | 10/2008 | Kristensson | 715/261 |

OTHER PUBLICATIONS

Rebbechi, Donovan, "sed," UNIX and Linux, Aug. 16, 2007, retrieved from the Internet Feb. 21, 2012: URL:http://www.panix.com/elflord//unix/sed.html.

"VRRAJEEB" et al., "Search and replace between two keywords," The UNIX and Linux Forums, May 8, 2005, May 11, 2005, retrieved from the Internet Feb. 21, 2012: URL:http://www.unix.com/shell-programming-scripting/18601-search-replace-words-between-two-keywords.html.

Gray, James Edward, II, "TextMate-Power Editing for the Mac," The Pragmatic Programmers, LLC, Jan. 1, 2007, pp. 37-49.

Tanaka, "Word Batch Conversion Advanced Technique," Nikkei PC 21, Japan, Nikkei BP, Inc., Sep. 1, 2004, vol. 9, No. 17, pp. 99-111.

* cited by examiner

FAMILY HISTORY

NO INFLAMMATORY BOWEL DISEASE

REVIEW OF SYSTEMS

REMAINDER OF REVIEW OF SYSTEMS REVIEWED IN DETAIL WITH THE PATIENT NEGATIVE OTHER THAN KNOWN NO HISTORY OF PRESENT ILLNESS AND PAST MEDICAL HISTORY

PHYSICAL EXAMINATION

MIDDLE-AGED GENTLEMAN ALERT COMPLAINING OF LEFT UPPER QUADRANT DISCOMFORT. VITAL SIGNS: TEMPERATURE: 97 DEGREES F, PULSE: 93, RESPIRATORY RATE: 16, BLOOD PRESSURE: 133/71. HEENT PUPILS EQUALLY ROUND AND REACTIVE TO LIGHT. TYMPANIC MEMBRANES INTACT. EARS TYMPANIC MEMBRANES CLEAN. MOUTH, THROAT NO BUCCAL LESIONS. NECK IS SUPPLE. LUNGS CLEAR TO AUSCULTATION. CHEST NO TENDERNESS. HEART NO MURMURS, GALLOPS OR RUBS. ABDOMEN SOFT, NORMAL BOWEL SOUNDS. NO ORGANOMEGALY OR MASSES NOTED. THERE IS MILD TENDERNESS TO PALPATION. LEFT UPPER QUADRANT WITHOUT GUARDING OR REBOUND. BACK NO PERCUSSION TENDERNESS OVER THE SPINE ACROSS THE TWO BY MOUTH EXTREMITIES.

CELL 1

THAN KNOWN HISTORY

PATIENT INFO

FIRST NAME
MIDDLE NAME
LAST NAME
SUFFIX
SEX
MRN
PATIENT ACCOUNT #
SSN
PATIENT LOCATION
DICTATION LOCATION
DATE OF BIRTH
AGE

JOB INFO

DATE OF ADMIT
DATE OF SERVICE
DATE OF DISCHARGE
DATE OF DICTATION
DOCUMENT TITLE     EMERGENCY MEDICINE REPORT

DEMOGRAPHICS | JOB | PROVIDERS

DOCUMENT EDITING USING ANCHORS

BACKGROUND

1. Field of the Invention

The present invention relates to editing documents and, more particularly, to correcting errors in draft documents produced using an automatic document transcription system.

2. Related Art

It is desirable in many contexts to generate a structured textual document based on human speech. In the legal profession, for example, transcriptionists transcribe testimony given in court proceedings and in depositions to produce a written transcript of the testimony. Similarly, in the medical profession, transcripts are produced of diagnoses, prognoses, prescriptions, and other information dictated by doctors and other medical professionals. Transcripts in these and other fields typically need to be highly accurate (as measured in terms of the degree of correspondence between the semantic content (meaning) of the original speech and the semantic content of the resulting transcript) because of the reliance placed on the resulting transcripts and the harm that could result from an inaccuracy (such as providing an incorrect prescription drug to a patient). It may be difficult to produce an initial transcript that is highly accurate for a variety of reasons.

The first draft of a transcript, whether produced by a human transcriptionist or an automated speech recognition system, may therefore include a variety of errors. Typically it is necessary to proofread and edit such draft documents to correct the errors contained therein. Such error correction is typically performed by human proofreaders and can be tedious, time-consuming, costly, and itself error-prone. What is needed, therefore, are improved techniques for correcting errors in draft documents.

SUMMARY

A user edits text in a draft document by providing input including left and right "anchor" text and replacement text. In response, a document editing system identifies an instance of the left anchor text followed by the right anchor text in the draft document, and replaces text between these instances with the replacement text specified by the user. For example, the user may type a string containing the left anchor text followed by the replacement text followed by the right anchor text, in response to which the system may perform the replacement just described. As a result, the user may specify both the location of, and a correction for, text in the draft document without using cursor keys or other navigation commands to navigate to the location of the text to be corrected, thereby increasing correction efficiency by avoiding the delay associated with such manual navigation.

For example, one embodiment of the present invention is directed to s computer-implemented method comprising: (A) identifying first anchor text, second anchor text, and replacement text; (B) determining whether a document contains an instance of the first anchor text and an instance of the second anchor text at a position in the document after the first anchor text; and (C) if it is determined that the document contains an instance of the first anchor text and an instance of the second anchor text at a position in the document after the first anchor text, then replacing text in the document between the instance of the first anchor text and the instance of the second anchor text with the replacement text.

Other features and advantages of various aspects and embodiments of the present invention will become apparent from the following description and from the claims.

DETAILED DESCRIPTION

A user edits text in a draft document by providing input including left and right "anchor" text and replacement text. In response, a document editing system identifies an instance of the left anchor text followed by the right anchor text in the draft document, and replaces text between these instances with the replacement text specified by the user. For example, the user may type a string containing the left anchor text followed by the replacement text followed by the right anchor text, in response to which the system may perform the replacement just described. As a result, the user may specify both the location of, and a correction for, text in the draft document without using cursor keys or other navigation commands to navigate to the location of the text to be corrected, thereby increasing correction efficiency by avoiding the delay associated with such manual navigation.

Figure 1:
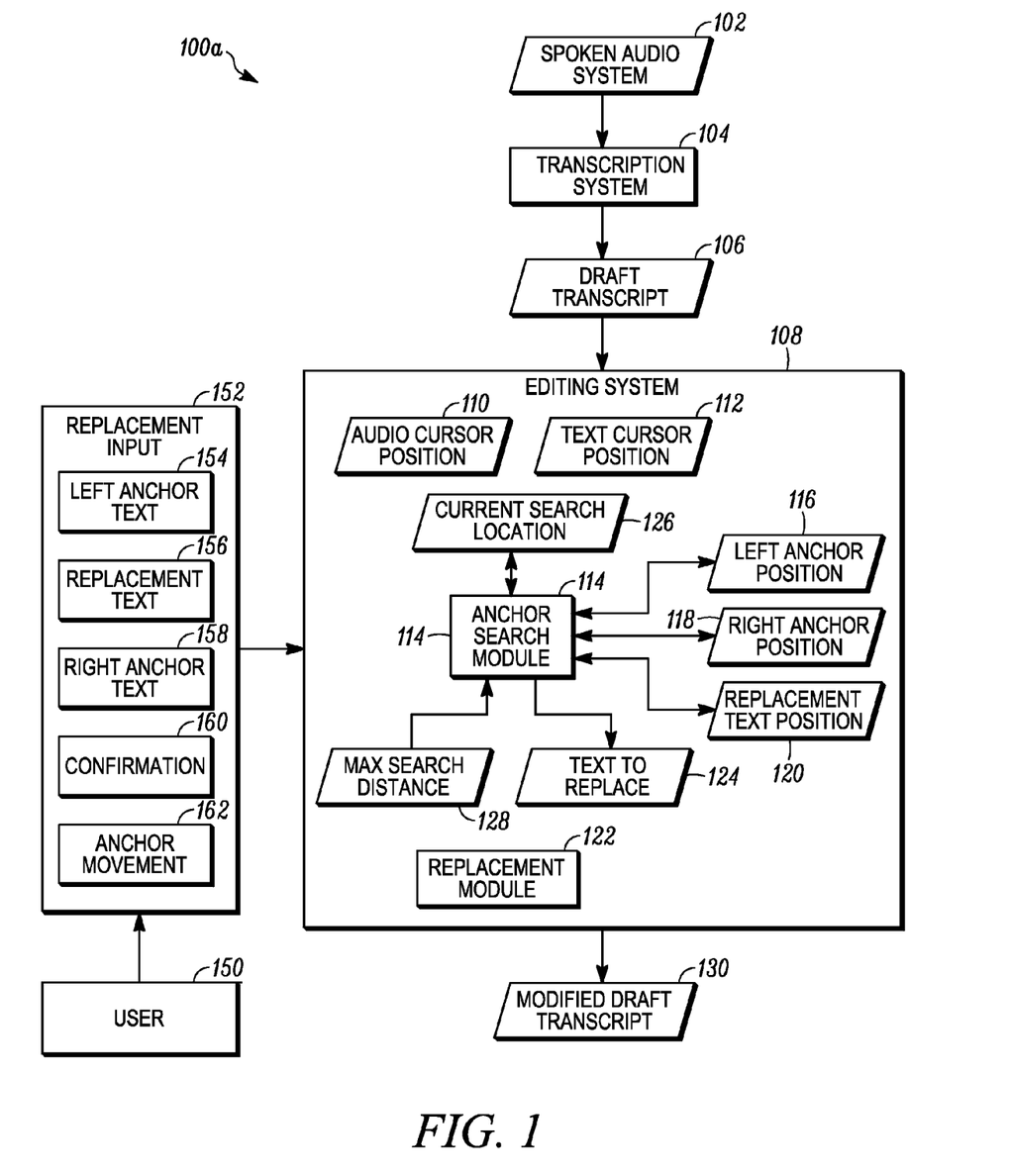
FIG. 1 is a dataflow diagram of a system for editing a draft transcript according to one embodiment of the present invention.
Figure 2A:
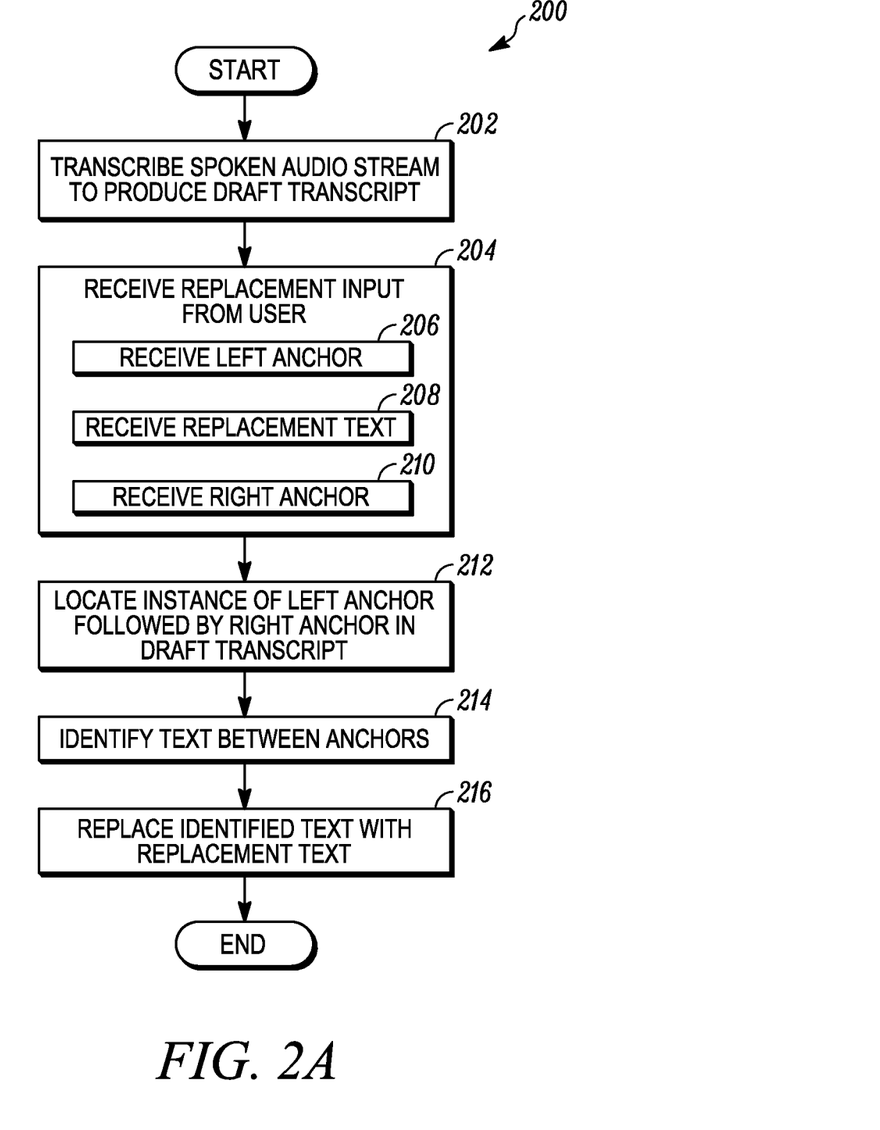
FIGS. 2A-2C are flowcharts of document editing methods performed by the system of FIG. 1 according to various embodiments of the present invention.

For example, referring to FIG. 1, a dataflow diagram is shown of a system 100 for editing a draft transcript 106 according to one embodiment of the present invention. Referring to FIG. 2A, a flowchart is shown of a method 200 performed by the system 100 of FIG. 1 according to one embodiment of the present invention. A transcription system 104 transcribes a spoken audio stream 102 to produce a draft transcript 106 (step 202). The spoken audio stream 102 may, for example, be dictation by a doctor describing a patient visit. The spoken audio stream 102 may take any form. For example, it may be a live audio stream received directly or indirectly (such as over a telephone or IP connection), or an audio stream recorded on any medium and in any format.

The transcription system 104 may produce the draft transcript 106 using a human transcriptionist, an automated speech recognizer, or any combination thereof. The draft transcript 106 may, for example, be either a literal (verbatim) transcript or a non-literal transcript of the spoken audio stream 102. Furthermore, although the draft transcript 106 may be a plain text document, the draft transcript 106 may also, for example, be a structured document, such as an XML document which delineates document sections and other kinds of document structure.

A user 150 uses a document editing system 108 to edit the draft transcript 106 and thereby to produce a modified (edited) version 130 of the draft transcript 106. For example, the user 150 may edit the draft transcript 106 to correct errors in the transcription process performed by the transcription system 104. The user 150 may, however, perform editing for other purposes, such as to clarify the meaning of text in the draft transcript 106 even when the original text produced by the transcription system 104 accurately represented the corresponding speech in the spoken audio stream 102. Therefore, although the following description may refer to "error correction" being performed by the user 150, more generally the user 150 may perform any kind of editing on the draft transcript 106.

Figure 3A:
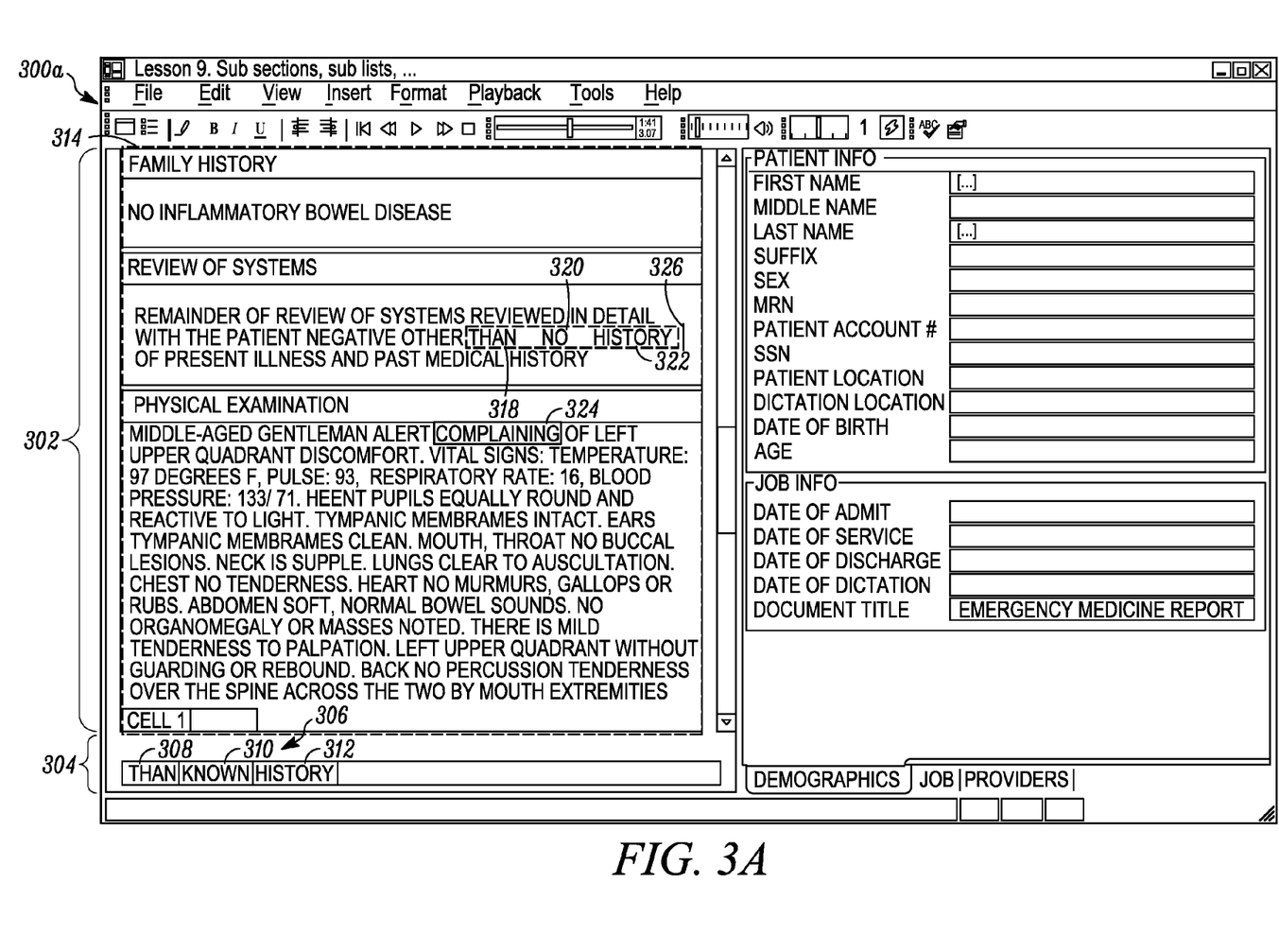
FIGS. 3A-3B are illustrations of graphical user interfaces used by the document editing system of FIG. 1 according to various embodiments of the present invention.

Referring to FIG. 3A, an illustration is shown of a first state 300a of a graphical user interface that is used by the editing system 108 to interact with the user 150 according to one embodiment of the present invention. The graphical user interface includes a frame 302 which displays a portion of text 314 in the draft transcript 106, in the manner similar to that used by a conventional word processor or other text editor. The document editing system 108 may play back the spoken audio stream 102 to the user 150 to enable the user 150 to determine whether the text 314 accurately represents the speech in the spoken audio stream 102. The editing system 108 may maintain the state of an audio cursor position 110 (FIG. 1), which represents the location in the spoken audio stream 102 that is currently being played back to the user 150. The document editing system 108 may provide a visual indication of the current audio cursor position 110 by highlighting the portion of the text 314 that corresponds to the audio cursor position 110. In FIG. 3A, the word "complaining" 324 is highlighted, indicating that in the state 300a of the graphical user interface illustrated in FIG. 3A, the audio cursor position 110 corresponds to speech in the spoken audio stream 102 that was transcribed as the word "complaining" 324 in the draft transcript 106. The document editing system 108 may dynamically update the visual indication of the audio cursor position 110 (e.g., the highlighted text) as the spoken audio stream 102 is played back, to enable the user 150 to visually track the text corresponding to the audio stream 102 as it is played back.

The editing system 108 may also maintain a state of a text cursor position 112, which indicates the position in the text 314 (and hence in the draft transcript 106) at which the next editing command (e.g., addition/deletion of text) will be applied. In the state 300a illustrated in FIG. 3A, the text cursor position 112 is visually indicated by a vertical line 326 between the words "history" and "of." Note that the text cursor position 112 and audio cursor position 110 may change independently of each other. For example, the user 150 may type text at the text cursor position 112 (e.g., at line 326) while the audio cursor position 110 continues to follow the playback of the spoken audio stream 102.

In the example state 300a shown in FIG. 3A, the draft transcript 106 includes an error, namely that the speech "than known history" in the spoken audio stream 102 was incorrectly transcribed as the text 316 "than no history," which includes individual words "than" 318, "no" 320, and "history" 322. To correct such an error using a conventional document editing system, the user 150 would typically move the text cursor 326 to the location of the incorrect word 320 manually, such as by using various arrow keys. This might require the user 150 to perform a significant amount of navigation. For example, conventional transcription editing systems may allow the text cursor 326 to be configured to follow the audio cursor 324 automatically in a so-called "piggy-back" mode. For example, the editing system 108 may allow the user 150 to issue commands which cause the system 108 to enter/exit the piggy-back mode. If the system 108 is in piggy-back mode and the user 150 did not notice the incorrect word 320 until the audio cursor 324 and piggy-backed text cursor 326 had reached the word "complaining," the user 150 would need to manually reposition the text cursor 326 to the incorrect word "no" 320 before manually correcting it. This might require entering several cursor navigation commands, which is often time-consuming, simply to reach the incorrect word 320, before manually deleting the incorrect word 320 and typing its replacement.

Furthermore, using the cursor keys or otherwise issuing text cursor navigation commands typically causes the system 108 to exit piggy-back mode. Therefore, if the user 150 of a conventional editing system 150 uses such manual navigation commands to move the text cursor 326 to the location of the text to be edited and then edits that text, the audio cursor position 110 will continue to move forward as the spoken audio stream 102 continues to play back, while the text cursor position 112 remains behind at the editing location. To "catch up" with the audio cursor position 110 the user 150 must then either re-enter piggy-back mode by manually issuing an "enter piggy-back mode" command (e.g., by hitting a predetermined "enter piggy-back mode" key combination), or visually identify the location in the text 314 corresponding to the current audio cursor position 110 and then manually move the text cursor position 112 so that it is at the same position as the audio cursor position 110. Either of these options is tedious and time-consuming, and may result in the user 150 losing track of the spoken audio stream 102 and/or corresponding text, thereby requiring the user 150 to manually rewind the spoken audio stream 102 to ensure accuracy, thereby introducing additional delay into the editing process.

Figure 3B:
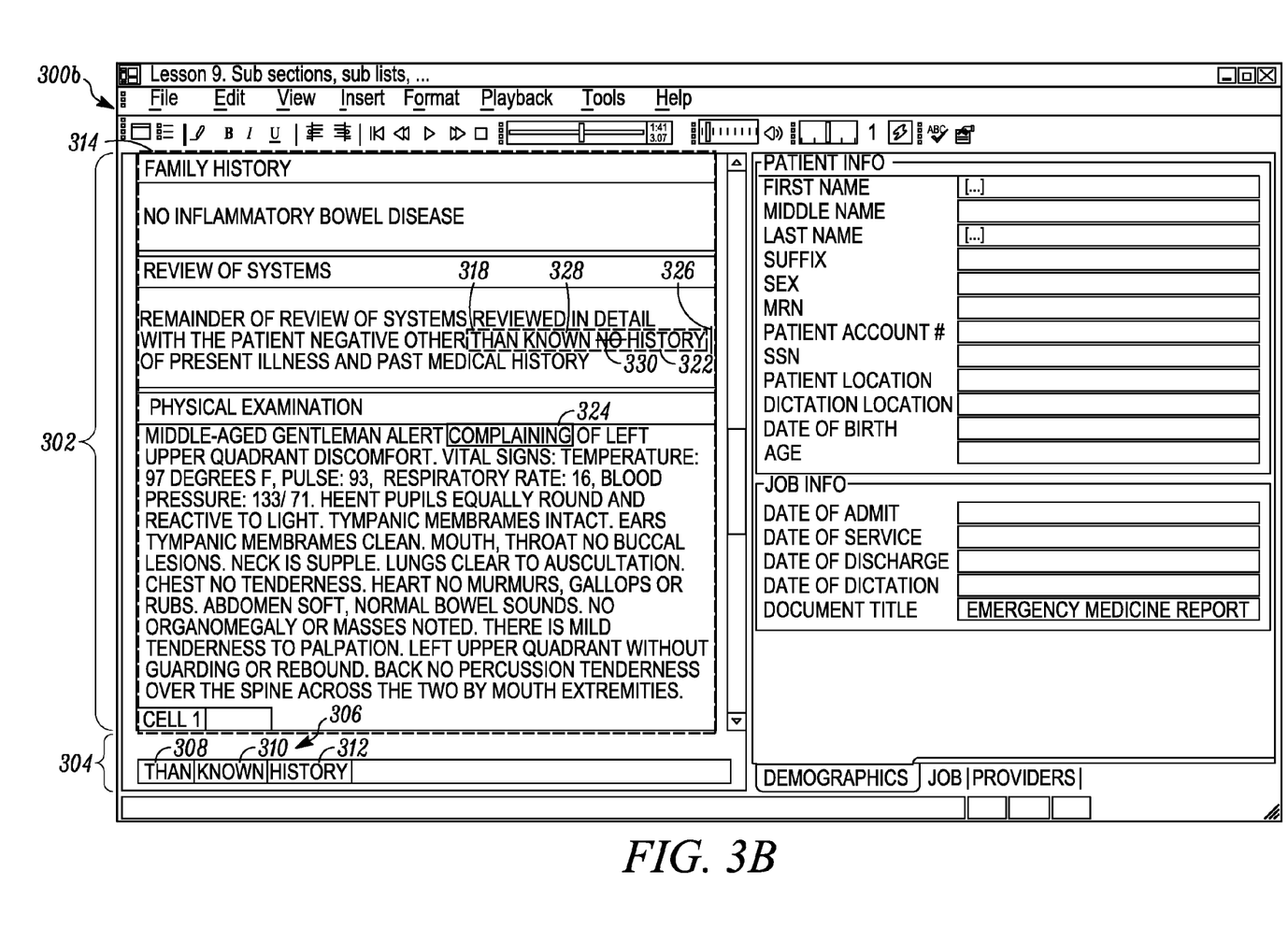

In contrast, in the embodiment shown in FIGS. 1-3, the user 150 may edit the incorrect word 320 without issuing cursor navigation commands, and instead by providing text replacement input 152 to the document editing system 108 (FIG. 2A, step 204). The replacement input 152 may, for example, include left "anchor" text 154 (step 206), replacement text 156 (step 208), and right "anchor" text 158 (step 210).

For example, in the example shown in FIG. 3A, the graphical user interface includes a replacement input field 304 into which the user 150 may type the replacement input 152. The user 150 may activate the replacement input field 304 to receive input by, for example, typing a predetermined key or key combination. Alternatively, for example, the user 150 may activate the replacement input field 304 for input by positioning a mouse cursor (not shown) within the field 304 and clicking a mouse button. As yet another example, the system 108 may enter a "anchor replacement" mode by default, or in response to a command from the user 150, during which any text typed by the user 150 may be entered into the replacement input field 304. These are merely examples of ways in which the user 150 may enter the replacement input 152 into the replacement input field 304. Once the field 304 is activated, the user 150 may provide the replacement input 152 by typing the replacement input 152 in the field 304.

In the example shown in FIG. 3A, the user 150 has typed "than known history" 306 as the replacement input 152, in which the left anchor text 154 is the word "than" 308, the replacement text 156 is the word "known" 310, and the right anchor text 158 is the word "history" 312. This indicates that the user 150 desires to locate "than" followed by "history" in the draft transcript 106, and to replace the text between those words with the word "known." The words "than" and "history" are referred to as "anchors" because they fix the location of the text to be replaced.

In general, the document editing system 108 uses the replacement input 152 to correct the incorrect word 320 by using an anchor search module 114 to identify an instance of the left anchor text 154 (e.g., "than" 308) followed by the right anchor text 158 (e.g., "history" 312) in the draft transcript 106 (step 212). Note that some amount of text may be between instances of the left anchor text 154 and the right anchor text 158 in the draft transcript 106. The anchor search module 114 may also identify text 124 (e.g., the word "no" 320) between the identified instances of the anchors (step 214). The search module 114 may store the positions of the left anchor instance, right anchor instance, and text to be replaced in state 116, 118, and 120, respectively. The document editing system 108 may then use a replacement module 122 to replace the identified text 124 with the replacement text 156 (e.g., the word "known" 310) in the document 106 (step 216).

The result of performing this replacement in the case of FIG. 3A is shown in the updated state 300*b* of the graphical user interface in FIG. 3B, in which the original (incorrect) word "no" 320 has been replaced with the replacement text "known" 328, and in which the word "no" 320 is shown in strikethrough 330 to indicate that it has been deleted. Note that in this example the user 150 has replaced the word "no" with "known" simply by typing the replacement input 306, rather than by manually moving the text cursor 326 to the location of the word to be replaced 124 using arrow keys or other cursor navigation commands. The document editing system 108 enables the user 150 to edit the draft transcript 106 in this way by performing two steps in response to the user 150 providing the replacement input 152: (1) locating the text 124 to be replaced, and (2) replacing that text 124 with the replacement text 156 specified by the user 150.

The editing system 108 may be configured to re-enter piggy-back mode automatically after the replacement has been performed so that the user 150 may continue proofreading the draft transcript 106 at the current audio cursor position 110 without any delay. Furthermore, the contents of the replacement field 304 may be cleared automatically after the replacement has been performed so that the user 150 may enter another replacement input into the field 304 without having to clear the contents of the field 304 manually.

Figure 2B:
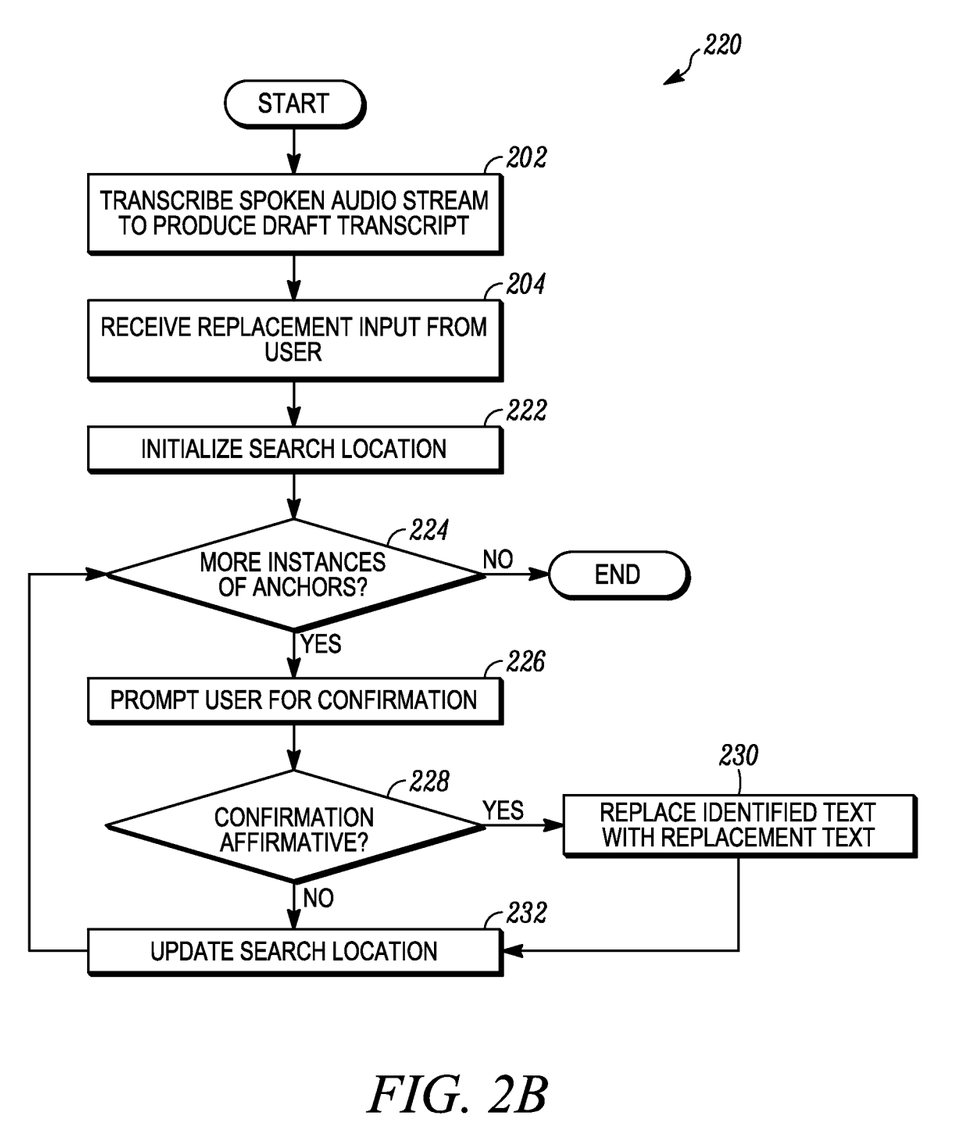

Referring to FIG. 2B, a flowchart is shown of another method 220 that may be used to edit the draft transcript 106 according to one embodiment of the present invention. Like the method 200 shown in FIG. 2A, the method 220 transcribes the spoken audio stream 102 to produce the draft transcript 106 (step 202) and receives the replacement input 152 from the user 150 (step 204).

The search module 114 then initializes a location 126 within the draft transcript 106 at which to begin searching for instances of the anchors 154 and 158 (step 222). For example, the search location 126 may be initialized to be the beginning of the draft transcript 106, the current text cursor position 112, or the position of the text in the document 106 corresponding to the current audio cursor position 110. The search module 114 may be configurable by the user 150 to initialize the search location 126 in any of these or other ways.

The search module 114 searches for an instance of the left anchor text 154 followed by the right anchor text 158 in the document 106, beginning at the current search location 126. If the search module 114 finds an instance of the pair of anchors 154 and 158 (step 224), the search module 114 may update the left and right anchor positions 116 and 118 to reflect the positions of the currently-found left and right anchor positions, respectively, and the replacement module 122 may prompt the user 150 to confirm that the text between the anchors 154 and 158 (e.g., the word "no" 320 in FIG. 3A) should be replaced with the replacement text 156 (e.g., the word "known" 310) (step 226). The replacement module 122 may prompt the user 150 in any of a variety of ways. For example, the replacement module 122 may highlight the current combination of left anchor text 154, text to be replaced 124, and right anchor text 158 in the display of the draft document 106, as illustrated by highlighted text 316 in FIG. 3A. Different formatting may be used to distinguish the instances of the anchors 154 and 158 from the instance of the replacement text 156. For example, the anchor instances 318 and 322 may be highlighted in a color (such as green), the replacement text instance 328 (FIG. 3B) may be highlighted in the same or a different color and underlined, and the replaced (deleted) text 330 may be highlighted in the same or a different color and displayed in strikethrough text.

If the search module 114 finds only a partial match for an anchor, such as matching the anchor "an" to the middle of a word (e.g., "stand") rather than to an entire word or the end of a word, the search module 114 may highlight the partial matching instance in a different color (e.g., yellow) than the color (e.g., green) used to indicate full matches. If the search module 114 does not find any instances of an anchor in the draft transcript 106, the search module 114 may display that anchor in a different color (e.g., red) in the replacement field 304 to indicate to the user 150 that the search has failed.

Furthermore, although in certain examples disclosed herein, the search module 114 matches the left anchor text 154 to suffixes of words in the draft transcript 106, this is merely an example and does not constitute a limitation of the present invention. For example, the search module 114 may match the left anchor text 154 to prefixes of words in the draft transcript 106. For example, the user 150 may provide the text "th" as the left anchor text 154 to match the word "than" 318. As a result, typing "th know h" in the replacement field 304 may match the text 316 "than no history." Note that this is an example where the replacement input 306 ("th known h") does not correspond to consecutive characters in the draft transcript 106.

It may be beneficial to allow the user 150 to provide prefixes as left anchors because it may be easier for the user 150 to quickly remember and type the beginnings of words rather than the endings of words. More generally, the system 108 may allow the user 150 to provide prefixes, suffixes, or any other kinds of substrings as the left anchor text 154 and/or right anchor text 156.

The user 150 provides confirmation input 160 to the document editing system 108 to indicate whether the user 150 wishes to perform the replacement. For example, the user 150 may hit the ENTER key to provide confirmation input 160 indicating that the replacement should be performed, and hit the ESCAPE key to indicate that the replacement should not be performed. If the user 150 confirms that the replacement should be performed (step 228), the replacement module 122 performs the replacement in the manner described above (step 230).

After the user 150 confirms or disconfirms the replacement, the anchor search module 114 updates the current search location 126 by advancing it to the position just after the current instance of the right anchor in the document 106 (step 232). The method 220 then returns to step 224, where it repeats for any remaining instances of the left and right anchors 154 and 158 in the draft document 108.

Note that the replacement module 122 may provide the user 150 with a preview of the effects of performing the replacement. For example, as the user 150 provides the replacement input 152 (e.g., types the replacement text 306), the replacement module 122 may show the replaced (deleted) text 330 in strikethrough and the replacement text 328 highlighted and underlined, as shown in FIG. 3B, even before the user 150 confirms that the replacement should be performed. If the user 150 indicates that the replacement should not be performed, the replacement module 122 may revert the displayed text 314 to its original form (e.g., that shown in FIG.

3A). Providing this kind of preview may increase the speed and accuracy with which the user 150 may deciding whether to confirm the replacement.

Figure 2C:
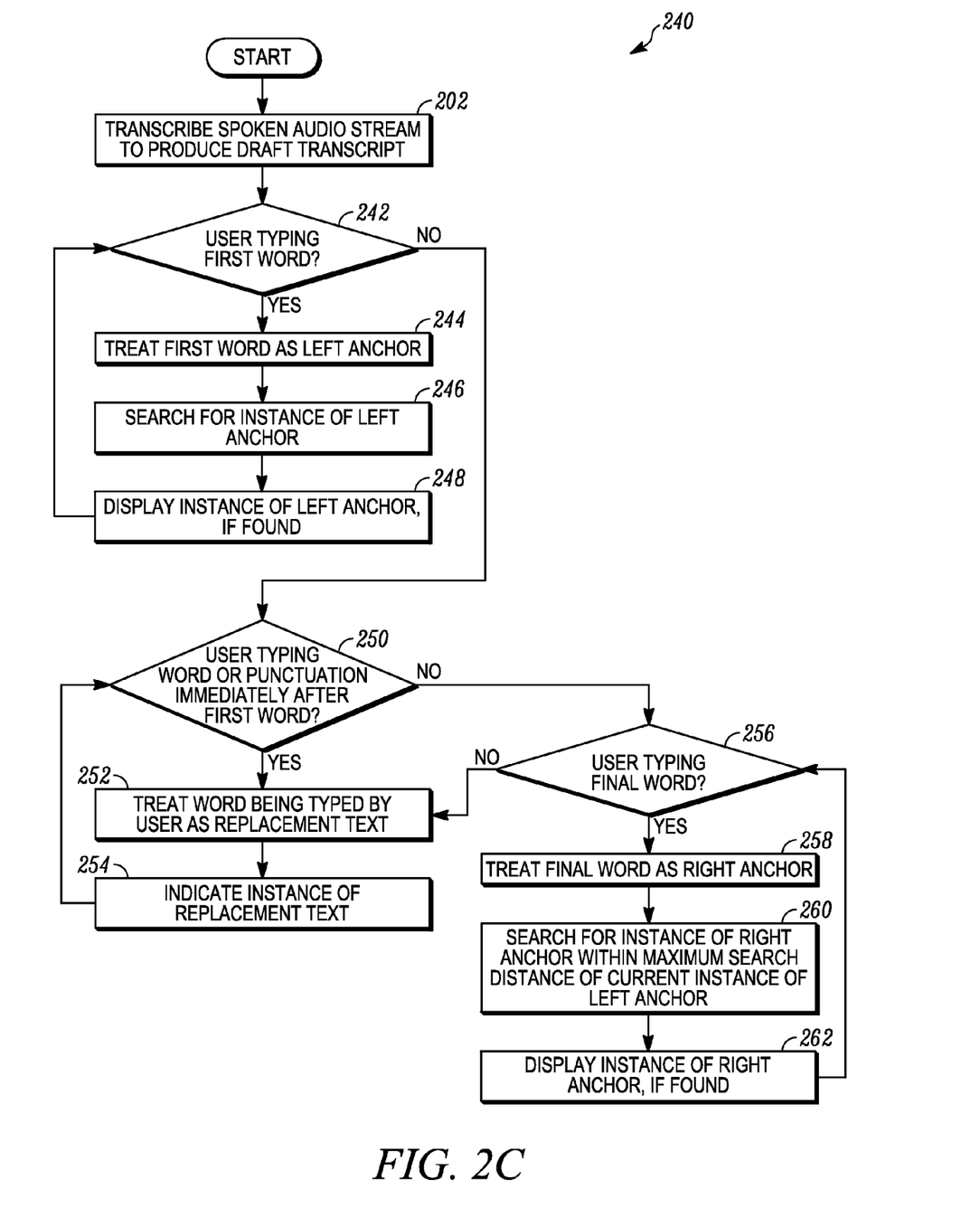

To further increase the efficiency of editing, the anchor search module 114 need not wait until after the user 150 has finished providing the replacement input 152 before searching for instances of the left anchor 154 and right anchor 158. Instead, for example, the search module 114 may search for the anchors 154 and 158 while the user 150 provides the replacement input 152, and provide dynamically-updated feedback about the results of that search to the user 150 while the user 150 provides the replacement input 152, as illustrated by the method 240 shown in FIG. 2C. As with the methods 200 and 220 of FIGS. 2A and 2B, respectively, the method 240 of FIG. 2C begins by transcribing the spoken audio stream 102 to produce the draft transcript 106.

Consider again the example shown in FIG. 3A. When the user 150 begins typing the replacement text 306, the search module 114 may consider the substring at the beginning of the replacement text 306 (step 242) to be the beginning of the left anchor text 154 (step 244), and begin searching for an instance of the left anchor text 154 based on the characters the user 150 has typed so far (step 246). For example, when the user 150 types the character "t", the search module 114 may search for the first instance of the character "t" in the draft transcript 106 and highlight that instance in the displayed text 314 (step 248). As the user 150 continues to type "th", the search module 114 may update its search to search for the first instance of the text "th" in the draft transcript 106 and highlight that instance in the displayed text 314. The search module 114 may continue in this manner until the user 150 types a space, punctuation mark, or other non-alphanumeric character (step 250), at which point the search module 114 may consider the user's input of the left anchor text 154 to be complete, and begin treating the next characters typed by the user 150 as the beginning of the replacement text 156 (step 252).

The search module 114 need not search for an instance of the replacement text 156 as it is typed by the user 150. Instead, the search module 114 may simply highlight whatever text (e.g., the text "no" 320 in FIG. 3A) immediately follows the currently-highlighted instance of the left anchor text 154 (e.g., the text "than" 318) (step 254). The search module 114 may continue in this manner until the user 150 types another space, punctuation mark, or other non-alphanumeric character, at which point the search module 114 may consider the user's input of the replacement text 156 to be complete (step 256), and begin treating the next substring (e.g., word or partial word) typed by the user 150 as the beginning of the right anchor text (step 258).

As the user 150 types the right anchor text 158, the search module 114 may search for the right anchor text 158 within some predetermined distance 128 (measured, for example, in characters or words) after the left anchor text 154 in the draft transcript 106 (step 260). For example, if the current instance of the left anchor text 154 is the word "than" 318, as shown in FIG. 3A, then when the user 150 types the letter "h" of "history" 312, the search module 114 may search for an instance of the letter "h" occurring after the work "than" 318 by no more than the number of characters or words specified by the maximum search distance 128. In the example illustrated in FIG. 3A, such an instance would be found and the search module 114 would highlight the letter "h" in "history" 322 (step 262). The search module 114 may continue to update its search as the user 150 continues typing the right anchor text 158 (e.g., the word "history" 322).

As the examples herein illustrate, the rightmost (final) word (or partial word or other distinct substring) currently typed in the replacement field 304 may be treated as the right anchor specified by the user 150. As a result, the search module 114 may first treat a particular word as a right anchor, and then treat that word as replacement text if the user 150 types an additional word, which then becomes treated as the right anchor, and so on.

Note that the maximum search distance 128 is optional. Furthermore, there may be multiple search distances. For example, one search distance (e.g., five words) may be applied to words, while another distance (e.g., zero words) may be applied to punctuation marks.

As the description above illustrates, although the particular anchors 308 and 312 shown in FIGS. 3A and 3B are complete words, this is not a requirement of the present invention. Rather, an anchor may be a part of a word.

It is possible that the search module 114 may identify an instance of the left anchor text 154 and/or the right anchor text 158 that differs from the instance intended by the user 150. For example, the user 150 may provide the replacement input "an known hist" in an attempt to target the text "than no history," in response to which the search module 114 may instead match the text "fan of history" if such text exists in the draft transcript 106. To account for such a possibility, the editing system 108 may allow the user 150 to provide anchor movement commands 162 for manually moving to the next or previous anchor in the document 106. For example, the system 108 may assign the ALT-LEFT ARROW and ALT-RIGHT ARROW keys to the functions of moving to the previous and next instances of the left anchor text 154, respectively.

Similarly, the system 108 may assign the SHIFT-ALT-LEFT ARROW and SHIFT-ALT-RIGHT ARROW keys to the functions of moving to the previous and next instances of the right anchor text 158, respectively. Note that the search module 114 may begin searching at the position 116 of the current instance of the left anchor text 154 for the next instance of the right anchor text 158 in response to the user's command. If no such instance of the right anchor text 158 is found, then the rightmost word typed in the replacement field 304 may be treated as a word to be inserted to the right of the current instance of the left anchor text 154, rather than as right anchor text.

Anchors may be used to edit the draft transcript in a variety of other ways. For example, if the search module 114 finds an instance of the left anchor 154 but does not find an instance of the right anchor 158 within the maximum search distance 128 of the instance of the left anchor 154, then the replacement module 122 may insert the replacement text 156 in the draft transcript 106 at the position immediately following the instance of the left anchor 154 rather than replacing the text following the left anchor 154 with the replacement text. In this case, all words to the right of the left anchor text 154 in the replacement input 152 (e.g., the words "known history" in the input 306 shown in FIG. 3A), including the potential right anchor for which no match was found (e.g., the word "history" 312), may be treated as the replacement text 156 and therefore be inserted into the document 106 after the instance of the left anchor 154.

As another example, the user 150 may replace a punctuation mark by typing a left anchor followed by single punctuation symbol, and without typing a right anchor, such as "hello, ". In response, the document editing system 108 may search for an instance of the left anchor 154 followed by any punctuation and, if such a combination is found, replace the found punctuation with the punctuation typed by the user 150. For example, the replacement input 152 "hello," would result in the text "hello." being replaced with "hello,".

Alternatively, for example, if the user 150 types a left anchor followed by a single punctuation symbol, and without typing a right anchor, such as "hello," then the document editing system 108 may treat the word ("hello") as a left anchor and the punctuation mark (",") as a right anchor. As described above, if the anchor search module 114 finds the text "hello." not followed by a comma, the replacement module 122 will treat the comma as replacement text, thereby replacing "hello." with "hello,." After performing this replacement, the document editing system 108 may apply text formatting rules to the document 106, such as a rule which deletes all punctuation symbols that immediately follow another punctuation symbol. This would result in replacing "hello,." with "hello," thereby effectively providing another way to replace the original text "hello." with the text "hello," but without the need to apply special rules to search for and replace punctuation. Rather, the general rules that apply to a left anchor followed by a single word may also be applied to a left anchor followed immediately by a punctuation mark.

Eliminating extra punctuation is merely one example of a post-replacement action that may be performed on the draft transcript 106. Other examples include enforcing use of a single space between words and two spaces after periods, and auto-capitalization of words at the beginning of sentences and of other kinds of words (such as the word "I").

Similarly, if the user 150 provides replacement input 152 consisting of a punctuation mark and then hits the DELETE key or otherwise issues a delete command, then the editing system 108 may search for an instance of the punctuation mark and delete that punctuation mark. For example, if the user 150 types a period, the document editing system 108 may treat the period as a left anchor and search for the next instance of a period in the document 106. The user 150 may then delete the period by hitting the DELETE key or otherwise issuing a delete command.

The editing system 108 may provide a variety of commands to facilitate navigating through the draft transcript 106. Such commands may be issued in any of a variety of ways, such as by using keyboard shortcuts. For example, the editing system 108 may provide a command for rewinding the spoken audio stream 102 to the location immediately following the most-recently replaced text. Such a command may be useful if the user 150 loses track of the spoken audio stream 102 while performing a replacement, since it provides a quick way for the user 150 to resume proofreading at the point immediately following that replacement.

If the user 150 solely types a left anchor in the replacement field 304 (i.e., without typing any replacement text or a right anchor) and then hits ENTER or issues an equivalent command, the editing system 108 may move the text cursor position 112 to the next occurrence of the specified left anchor in the draft transcript 106. This provides a quick way for the user 150 to jump to text in the document 106 without using the cursor keys or other navigation commands.

Similarly, if the user 150 solely types a left anchor in the replacement field 304 (i.e., without typing any replacement text or a right anchor) and then hits DELETE or issues an equivalent command, the editing system 108 may delete the next occurrence of the left anchor in the draft transcript 106. This provides a quick way for the user 150 to delete the next occurrence of the specified left anchor in the document 106 without using the cursor keys or other navigation commands to navigate to that occurrence and then manually delete it.

If the user 150 hits a cursor key, the ESCAPE key, or other predetermined key, the editing system 108 may leave piggyback mode. This provides the user 150 with a quick way to leave piggyback mode in the event that the user 150 wishes to navigate through the document 106 manually, without being tied to the audio cursor position 110.

In general, these and other embodiments of the present invention enable the user 150 to edit the document 106 with minimal use of the cursor arrow keys and other manual text cursor navigation commands, thereby reducing the amount of input that the user 150 must provide and increasing overall editing efficiency in comparison to conventional techniques. Although such an approach may not be more efficient in all circumstances and/or for all users, the user 150 always has the option of leaving anchor editing mode and using conventional techniques to edit the draft document 106. As a result, individual users may use any combination of conventional editing techniques and the editing techniques disclosed herein to edit the document 106 in the manner that is most efficient for them.

Although in certain embodiments described herein the draft transcript 106 is produced by transcribing speech, this is not a requirement of the present invention. Rather, the techniques disclosed herein may be applied to any document, whether or not that document was produced by transcribing speech. For example, the techniques disclosed herein may be applied to documents that are written without reference to speech. The document transcript 106, therefore, need not be a "transcript," but more generally may be any kind of document.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. For example, elements of the various methods of FIGS. 2A-2B may be combined with each other.

The invention is not limited to any of the described fields (such as medical and legal reports), but generally applies to any kind of structured documents. Furthermore, the various documents used by embodiments of the present invention (such as the draft transcript 106, the edited transcript 110, and the edited document 624) may be represented in any machine-readable form. Such forms include plain text documents and structured documents represented in markup languages such as XML. Such documents may be stored in any computer-readable medium and transmitted using any kind of communications channel and protocol.

The techniques disclosed herein may be used to perform actions other than error detection and correction. For example, the techniques disclosed herein may be applied to draft documents produced by automatic transcription systems. Such systems include an automatic speech recognizer that associates with each word a "confidence measure" indicating the likelihood that the word has been recognized correctly. When the techniques disclosed herein are applied to a draft document having such confidence measure annotations, the system may lower the confidence measure of any content that is identified as a likely error region (e.g., any content D that matches the content D in an editing pattern (D, E, C)). Such a lowered confidence measure may then trigger the content for review and correction.

Furthermore, different kinds (classes) of errors may be identified and treated differently. For example, deletions of content may be treated differently than modifications of content, which may in turn be treated differently than additions of content. Misspelling of a word may be treated differently than replacement of a word with a different word. Punctuation errors may be treated differently than spelling errors. Error classification may be performed at the time of editing pattern creation or at the time of error detection. When an error is detected, the class of the error may be used to select the corrective action to be taken and/or to suggest a course of action for preventing the error in the future. For example, the class of the error may be used to assist in improving the (human and/or automated) transcription system 104 that is used to produce draft documents (such as the draft transcript 106). The class of the error may also be used to define special correction rules that apply to particular classes of errors.

It was stated above that each classifier is associated with corresponding content D. The classifiers 122 may be associated with content at any level of granularity. For example, a classifier may be associated with a particular word (e.g., "John"), in which case the classifier would select the appropriate correction rule to apply to that word depending on the context in which it appears. A classifier may, however, be associated with content at any other level of granularity, such as a sentence, document section, or even an entire document. In each case the classifier selects the appropriate correction rule to apply to corresponding content based on the context in which it appears.

Although certain techniques are described herein as being applied in the context of automatic transcription systems, this is not a requirement of the present invention. For example, FIG. 1A shows the use of a draft transcript 106 and corresponding edited transcript 110 to train the system 100. The system 100 may, however, be trained with draft documents (and corresponding edited documents) that were not generated using (manual or automated) transcription. For example, the system 100 may be trained using documents that were written manually or that were generated from other documents using optical character recognition (OCR). Similarly, the draft document 702 that is corrected by the correction system 704 need not be a draft transcript, but rather may be any kind of document for which error detection and correction is desired.

Although the rules 118 are referred to herein as "correction" rules, such rules are not limited to correcting transcription errors, but rather may be used more generally to perform any kind of editing operation. For example, a correction rule may be used to edit text to comply with a formatting requirement. Therefore, the correction rules 118 more generally represent editing rules.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method comprising:
(A) using an automatic speech recognizer to produce a document based on an audio signal;
(B) receiving input text;
(C) determining whether the input text contains at least one non-alphanumeric character;
(D) if, during (C), it is determined that the input text does not contain at least one non-alphanumeric character, then:
  (D)(1) identifying the input text as first anchor text;
  (D)(2) determining whether the document contains an instance of the first anchor text;
  (D)(3) if it is determined that the document contains an instance of the first anchor text, then identifying the instance of the first anchor text in the document;
(E) if, during (C), it is determined that the input text contains solely a first non-alphanumeric character, then:
  (E)(1) identifying a portion of the input text appearing before the first non-alphanumeric character as the first anchor text;
  (E)(2) determining whether the document contains an instance of the first anchor text;
  (E)(3) identifying, in the document, a portion of the input text appearing after the first anchor text as replacement text;
(F) if, during (C), it is determined that the input text contains a plurality non-alphanumeric characters, then:
  (F)(1) identifying the portion of the input text appearing before a first one of the plurality of non-alphanumeric characters as first anchor text, identifying the portion of the input text appearing after a last one of the non-alphanumeric characters as second anchor text, and identifying a portion of the input text in between the first anchor text and the second anchor text as replacement text;
  (F)(2) determining whether the document contains an instance of the first anchor text and an instance of the second anchor text at a position in the document after the instance of the first anchor text;

(F)(3) if it is determined that the document contains an instance of the first anchor text and an instance of the second anchor text at a position in the document after the instance of the first anchor text, then:

(F)(3)(a) identifying text in the document between the instance of the first anchor text and the instance of the second anchor text;

(F)(3)(b) replacing the text between the instance of the first anchor text and the instance of the second anchor text with the replacement text, without replacing the instance of the first anchor text and without replacing the instance of the second anchor text; and (F)(3)(c) moving, automatically after (D)(2), a text cursor to a position in the document corresponding to a current audio cursor position representing a location in the audio signal that is being played back.

2. The method of claim 1, wherein in (F)(1), the first one of the plurality of non-alphanumeric characters is a leftmost non-alphanumeric character, and the last one of the plurality of non-alphanumeric characters is a rightmost non-alphanumeric character.

3. The method of claim 2, wherein (B) comprises receiving a text string from a user comprising the leftmost non-alphanumeric character, the replacement text, and the rightmost non-alphanumeric character, in that order.

4. The method of claim 1, wherein (B) comprises receiving the input text without changing a position of a text cursor within the document.

5. The method of claim 1, wherein (C) is performed while receiving the input text from a user.

6. The method of claim 1, wherein (F)(3)(b) comprises replacing all of the text between the instance of the first anchor text and the instance of the second anchor text with the replacement text.

7. The method of claim 1, wherein the first anchor text comprises a word.

8. The method of claim 1, wherein (F)(1) and (F)(2) are performed without receiving text cursor navigation commands from the user.

9. The method of claim 1, wherein (F)(2) comprises:

(F)(2)(a) determining whether the document contains an instance of the first anchor text and an instance of the second anchor text at a position in the document after the first anchor text; and (F)(2)(b) if the document is determined to contain an instance of the first anchor text and an instance of the second anchor text at a position in the document after the first anchor text, then:

(F)(2)(b)(1) prompting a user to provide input indicating whether to replace text in the document between the instance of the first anchor text and the instance of the second anchor text; and (F)(2)(b)(1) receiving the input from the user indicating whether to replace text in the document between the instance of the first anchor text and the instance of the second anchor text; and wherein (F)(3)(b) comprises:

(F)(3)(b)(1) replacing the text in the document between the instance of the first anchor text and the instance of the second anchor text with the replacement text only if the user input indicates that the text in the document is to be replaced.

10. An apparatus comprising:

automatic speech recognition means for producing a document based on an audio signal;

user input means for receiving input text;

character determination means to determine whether the input text contains at least one non-alphanumeric character;

anchor identification means for identifying the input text as first anchor text if the character determination means determines that the input text does not contain at least one non-alphanumeric character;

search means for determining whether the document contains an instance of the first anchor text if the character determination means determines that the input text does not contain at least one non-alphanumeric character;

text identification means for identifying the instance of the first anchor text in the document if the character determination means determines that the input text does not contain at least one non-alphanumeric character;

the anchor identification means for identifying a portion of the input text appearing before a sole first non-alphanumeric character as the first anchor text if the character determination means determines that the input text does contain solely the first non-alphanumeric character;

the search means for determining whether the document contains an instance of the first anchor text if the character determination means determines that the input text does contain solely the first non-alphanumeric character;

the text identification means for identifying, in the document, a portion of the input text appearing after the first anchor text as replacement if the character determination means determines that the input text does contain solely the first non-alphanumeric character;

the anchor identification means for identifying a portion of the input text appearing before a first one of a plurality of non-alphanumeric characters as first anchor text, for identifying a portion of the input text appearing after a last one of the plurality of non-alpha-numeric characters as second anchor text, and identifying a portion of the input text in between the first anchor text and the second anchor text as replacement text, if the character determination means determines that the input text contains a plurality of non-alphanumeric characters;

the search means for determining whether the document contains an instance of the first anchor text and an instance of the second anchor text at a position in the document after the instance of the first anchor text;

the text identification means for identifying text in the document between the instance of the first anchor text and the instance of the second anchor text if it is determined that the document contains an instance of the first anchor text and an instance of the second anchor text at a position in the document after the instance of the first anchor text;

replacement means for replacing the text in the document between the instance of the first anchor text and the instance of the second anchor text with the replacement text if it is determined that the document contains the instance of the first anchor text and the instance of the second anchor text at the position in the document after the first anchor text, without replacing the instance of the first anchor text and without replacing the instance of the second anchor text, and for moving, automatically after replacing the text in the document between the instance of the first anchor text and the instance of the second anchor text, a text cursor to a position in the document corresponding to a current audio cursor position representing a location in the audio signal that is being played back.

11. The apparatus of claim 10,
the first one of the plurality of non-alphanumeric characters is a leftmost non-alphanumeric character, and the last one of the plurality of non-alphanumeric characters is a rightmost non-alphanumeric character.

12. The apparatus of claim 11, wherein the user input means comprises means for receiving a text string from a user comprising the leftmost non-alphanumeric character, the replacement text, and the rightmost non-alphanumeric character, in that order.

13. The apparatus of claim 10, wherein the user input means comprises means for receiving the text input without changing a position of a text cursor within the document.

* * * * *